United States Patent [19]

Bischoff

[11] 4,385,220
[45] May 24, 1983

[54] MOTOR SWITCH AND PROTECTOR MOUNTING BRACKET

[75] Inventor: Robert F. Bischoff, St. Louis, Mo.

[73] Assignee: Emerson Electric Co., St. Louis, Mo.

[21] Appl. No.: 941,916

[22] Filed: Sep. 13, 1978

[51] Int. Cl.³ .............................................. N01N 1/64
[52] U.S. Cl. .................................... 200/293; 200/295
[58] Field of Search ................. 310/68 B, 68 C, 68 D, 310/68 E; 200/80 R, 332, 335; 248/300

[56] References Cited

U.S. PATENT DOCUMENTS

| | | | |
|---|---|---|---|
| 809,441 | 1/1906 | Hanks | 248/300 X |
| 882,835 | 3/1908 | McGillivray | 248/300 X |
| 1,260,649 | 3/1918 | Conrad | 310/68 B X |
| 1,600,816 | 9/1926 | Harbert | 248/300 X |
| 2,099,050 | 11/1937 | Chamberlain | 200/80 R |
| 2,855,171 | 10/1958 | Gardner | 248/300 X |
| 2,877,323 | 3/1959 | Naher | 200/80 R X |
| 3,547,274 | 12/1970 | Sosinski | 248/314 X |
| 3,782,669 | 1/1974 | Lewis | 248/674 |
| 4,034,173 | 7/1977 | Crow et al. | 200/80 R |
| 4,054,767 | 10/1977 | Anderson et al. | 200/80 R X |
| 4,095,073 | 6/1978 | Frank | 200/80 R X |
| 4,163,913 | 8/1979 | Barratt | 310/68 C X |
| 4,250,419 | 2/1981 | Zolman | 310/68 C |

Primary Examiner—William H. Schultz
Attorney, Agent, or Firm—Polster, Polster and Lucchesi

[57] ABSTRACT

A dynamoelectric machine in the form of an induction motor includes a pair of end shields for supporting a rotor assembly. At least one of the end shields is a die cast structure having a channel formed in it. The channel is sized to receive a protector for the motor. A bracket utilized in conjunction with the motor includes a spring for biasing the protector within the channel, and a mounting surface to which an external electrical switch is mounted. The bracket includes a pair of arms arranged to permit mounting of the bracket on the induction motor side of the end shield. Consequently, dimensional variations caused by end shield design or manufacture are eliminated and the effect of those dimensional variations on switch/actuator performance no longer is significant.

12 Claims, 8 Drawing Figures

MOTOR SWITCH AND PROTECTOR MOUNTING BRACKET

BACKGROUND OF THE INVENTION

This invention relates to mounting brackets, and in particular to a mounting bracket adapted for use with an electric motor. Those skilled in the art will recognize the wide applicability of the bracket of this invention in other related situations where sensor or control elements, for example, are mounted to a primary assembly.

Split phase induction motors find use in many appliances with high volume production. These motors commonly include an auxiliary or start winding wound to have a greater resistance than the main field winding, with the starting winding being physically displaced from the main winding. Such motors frequently utilize a number of switches for selectively controlling a number of circuits. For example, single phase induction motors often employ switches to de-energize the start winding once the motor reaches a predetermined operating speed. Concurrently, the same switch may be utilized to selectively regulate other associated electrical circuits. One common way of effectuating the energization of the start winding in response to a predetermined motor speed is by a centrifugally actuated mechanism, responsive to motor speed, which opens the switch of a winding control switch unit in the circuit of the start winding when the motor attains a desired operating or running speed. Generally, such arrangements utilize a lever arm mounted between the switch and the actuator which is engaged by the actuator to operate the switch.

It is known, in the prior art, to use a separable bracket to mount a switch and associated motor protector to a motor end shield. For example, the U.S. Pat. to Lewis, No. 3,782,669, issued Jan. 1, 1974, discloses a separable bracket adapted to carry both an electrical switch, a lever for operating the switch, and an associated motor protector. In Lewis, the protector is clipped to the bracket unit in a conventional manner. The bracket also is mounted exteriorly of the end shield, so that dimensional variations in the end shield can affect the positioning of the bracket, and more importantly the positioning of the lever utilized to actuate the switch with respect to the actuator, the actuator commonly being mounted on a shaft of the associated rotor assembly for the motor.

As will be appreciated by those skilled in the art, dimensional variations in the axial arrangement of actuator and switch components can affect operating life of the switch adversely. The invention disclosed hereinafter provides an end shield and bracket arrangement which simplifies protector mounting to a dynamoelectric machine by forming the end shield on the switch end of the motor with a channel adapted to receive the protector. The bracket is formed with spring means for biasing the protector in the channel. The channel and spring arrangement simplifies protector mounting techniques and eliminates the need for an independent clip for protector mounting. In addition, the channel enables the protector to be mounted in close proximity to the motor windings so that both heat transfer from and current flow through the windings may be employed to protect the motor. The protector is mounted firmly in position so that external lead wires may be connected to it easily. This facilitates insertion of the protector in the motor electrical circuit, and enables this connection to be automated, if desired. The bracket also is provided with a pair of mounting arms which permit mounting of the bracket to the motor side of the end shield, so that variations in end shield design or manufacture no longer affect the axial dimensions and dimensional tolerances of the switch and lever arm arrangement.

One of the objects of this invention is to provide a low cost mounting assembly for an electrical switch.

Another object of this invention is to provide a mounting assembly having spring means for biasing a motor protector in position against an associated end shield of a dynamoelectric machine.

Another object of this invention is to provide a bracket assembly for a dynamoelectric machine which reduces axial dimension variation between a switch mounted to the bracket and any associated actuator.

Another object of this invention is to provide an improved motor protector mounting structure.

Other objects of this invention will be apparent to those skilled in the art in light of the following description and accompanying drawings.

SUMMARY OF THE INVENTION

In accordance with this invention, generally stated, a mounting bracket is provided for use with an electric motor, the mounting bracket being attached to an end shield of the motor on the stator core side of the end shield. The bracket provides a mounting surface for an electrical switch and related switch operating mechanisms. The end shield of the motor is formed with a protector receiving receptacle. The motor protector, upon placement in the receptacle, is positioned near the windings of the motor. The bracket includes spring means for biasing the protector in the receptacle.

DESCRIPTION OF THE PREFERRED EMBODIMENT

Figure 1:
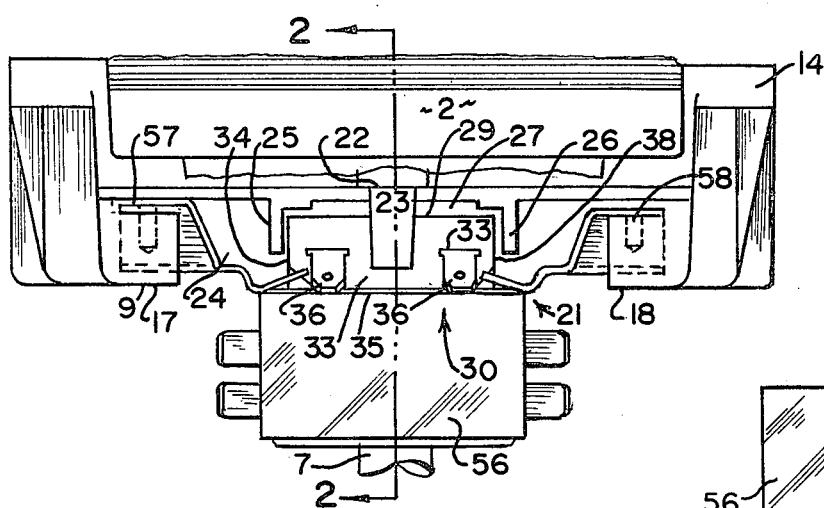
FIG. 1 is a top plan view, partly broken away, of a motor employing one illustrative embodiment of mounting bracket of this invention.
Figure 2:
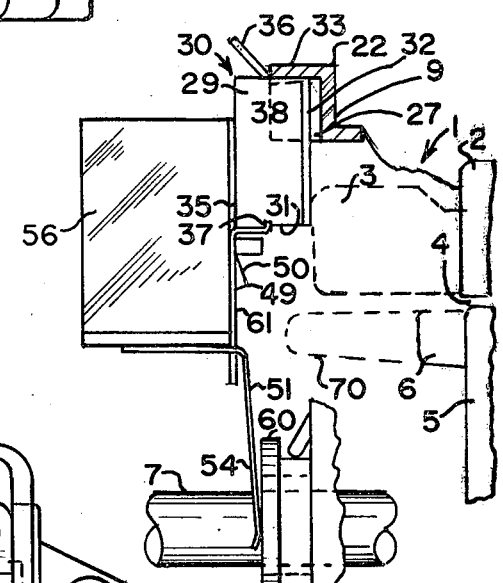
FIG. 2 is a sectional view, partly broken away, taken along the line 2—2 of FIG. 1.
Figure 3:
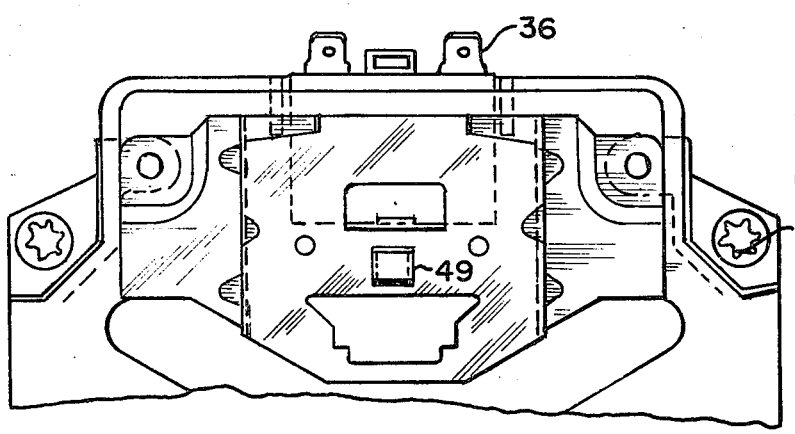
FIG. 3 is a view in front elevation, partly broken away, of the motor shown in FIG. 1, a switch assembly shown in FIG. 1 being removed for explanational purposes.
Figure 4:
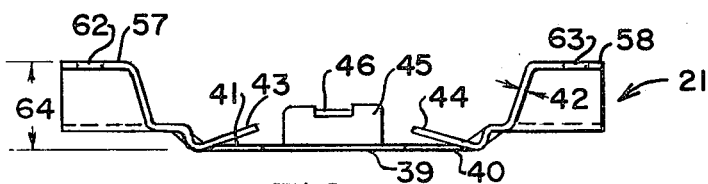
FIG. 4 is a top plan view of the bracket assembly utilized in conjunction with the motor of FIG. 1.
Figure 5:
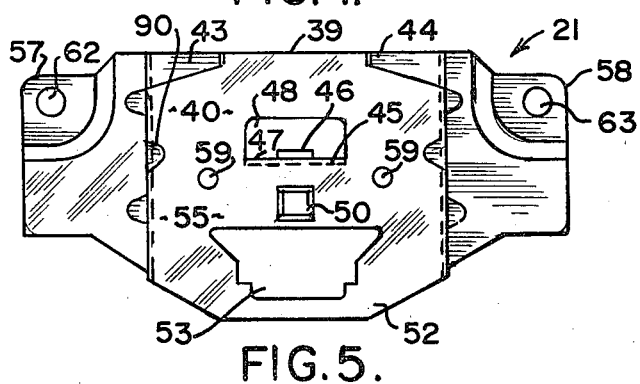
FIG. 5 is a view in front elevation of the bracket shown in FIG. 4.
Figure 6:
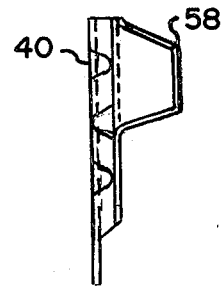
FIG. 6 is a view in side elevation thereof.

Referring now to FIGS. 1 and 2, reference numeral 1 indicates a motor having a core 2 constructed from a plurality of laminations formed from suitable magnetic material. The core 2 has an axial opening 4 extending through it, and a plurality of slots (not shown) are arranged annularly about the opening 4. The slots are adapted to receive a winding 3 in a conventional manner. In general, the winding 3 includes a main and an auxiliary winding arranged to define electrical poles in accordance with known electrical theory and practice. The opening 4 has a rotor assembly 5 inserted in it. The rotor assembly 5 preferably includes a rotor core of a squirrel cage design having an end ring 6 at each end of the rotor core. The end rings 6 often have a plurality of blades 70 associated with them, an illustrative example of which is shown in phantom lines in FIG. 2. The blades 70 commonly are used to improve air flow characteristics across the winding 3. Rotor assembly 5 has an axial opening through it which is used to mount the rotor core on a shaft 7. Shaft 7 is supported by a suitable bearing means, not shown, usually carried by an end shield 9 along a first end of the rotor assembly 5, and by a second end shield, not shown, at the second end of the rotor assembly. For purposes of this specification, both of the end shields are denominated by the reference numeral 9. As later described, the end shield 9 shown has certain structural features which are required only on one end of the motor 1. The stator/rotor combination may be mounted within a housing, not shown, closed by the end shields, or the end shield pair may be mounted directly to the core 2. In the embodiment illustrated, the end shields 9 and core 2 are joined directly to one another by fasteners 10.

Figure 7:
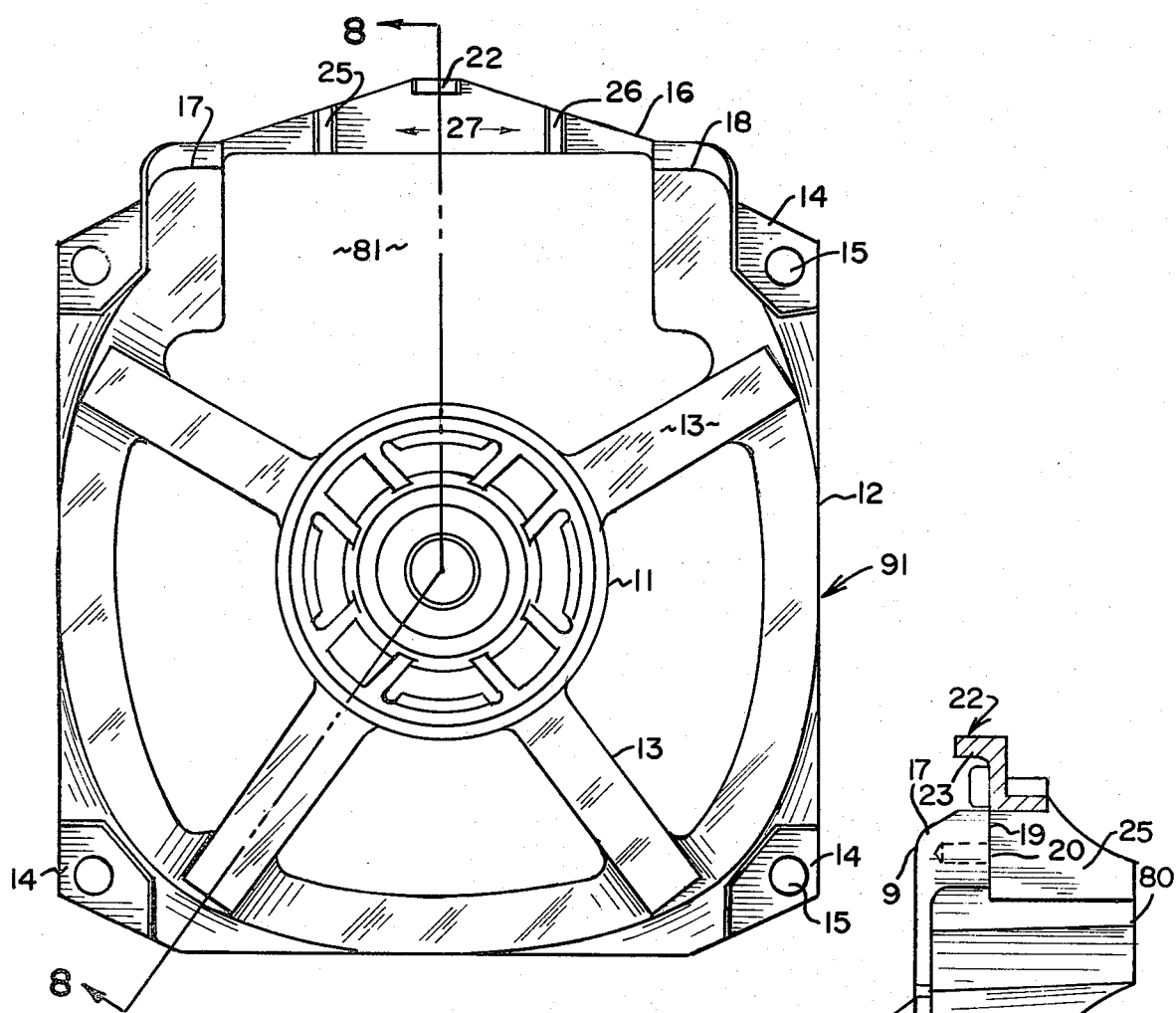
FIG. 7 is a front elevational view of an end shield employed in the motor assembly of FIG. 1.
Figure 8:
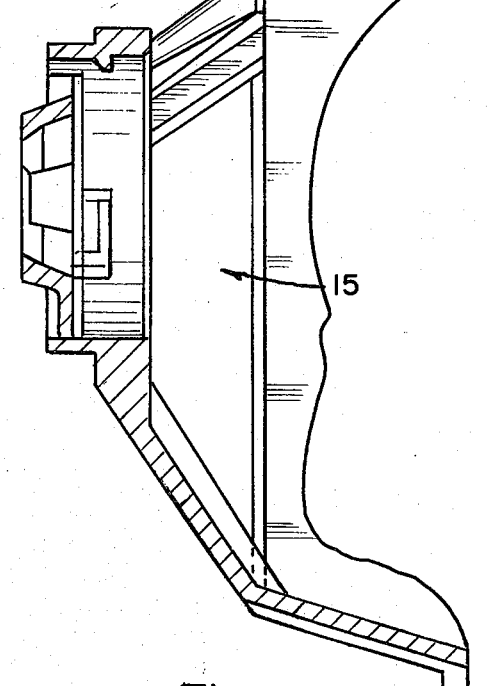
FIG. 8 is a sectional view taken along the line 8—8 of FIG. 7.

An individual end shield 9 employed for a particular motor design may assume a variety of configurations. In the preferred embodiment illustrated in FIGS. 7 and 8, the end shield 9 includes a central hub 11 which houses a suitable bearing means. Preferably, the bearing means is a self-aligning bearing. For example, the bearing may be similar to that described in the U.S. Pat. to Daniels, No. 4,090,749, or the U.S. Pat. No. to Lewis, 3,782,669. The end shield 9 has an outer structure 12 attached to the hub 11 along a plurality of spokes 13 which extend radially between the hub 11 and structure 12.

The outer structure 12 includes a plurality of spaced mounting pads 14 formed at four predetermined locations about the structure 12. The pads have a face 80 which is constructed to be flush fitting with the core 2 of the motor 1. Each of the pads 14 also has a opening 15 formed in it, which is utilized to attach the end shield 9 to the stator core 2. As indicated, attachment is accomplished with the fasteners 10.

The outer structure 12 has a top 16 which delimits a mounting opening 81. The opening 81 is sized to receive a bracket assembly 21, described in greater detail hereinafter. The end shield 9 also has a surface 17 and a surface 18 positioned to permit attachment of the bracket assembly 21 along a face 19 thereof. The face 19 has an opening 20 formed in the material thickness of the end shield, a single opening 20 being formed in each of the surfaces 17 and 18. The face 19 of the surfaces 17 and 18 is formed along the same side of the end shield as the faces 80 which abut the core 2 in the mounted position of the end shield. This is an important feature of my invention, because all mounting surfaces are on the same side of the die used to cast the end shield 9. As will be appreciated by those skilled in the art, this simplifies motor switch and actuator placement because dimensions can be predetermined accurately. Dimensional variations caused by end shield design, for example, present in prior art bracket/end shield construction as exemplified by the above-mentioned Lewis U.S. Pat. No. 3,782,669, are largely eliminated. The openings 20 receive conventional fasteners to mount the bracket assembly 21 to the end shield 9.

The structure 12 also has a tab 22 integrally formed with it. The tab 22 has a part 23 projecting axially of the end shield 9. A pair of spaced members 25 and 26, respectively, are positioned on opposite sides of the part 23 of tab 22 along the top 16. The projecting part 23, and members 25 and 26 together define a receptacle 27. The receptacle 27 is sized to receive a motor protector 29.

Motor protector 29 is conventional and is inserted in the motor 1 electrical circuit to protect the windings 3 against overload conditions. In general, the protector includes current and heat sensitive elements. Because of the heat responsive elements of the motor protector, it is desirable to locate the protector near the motor windings 3. A variety of commercially available protector devices are compatible with this invention. In general, the protector 29 includes a casing 30 having a bottom wall 31, a back wall 32, a top 33 and side walls 34, 35 and 38, respectively. A pair of terminals 36 extend through the top wall 33 while the bottom wall 31 has a groove 37 formed in it. The groove 37 is important for purposes later described.

As may be observed in FIG. 2, the end shield 9, and in particular, the receptacle 27 enables the protector 29 to placed very near the motor winding 3 for good thermal conductivity between the protector and motor winding.

Bracket assembly 21 includes a front face 40 and a rear face 41 separated by a material thickness 42. A pair of spring tabs 43 and 44, respectively, are integrally formed from the material thickness 42 and extend outwardly along the face 41 side of the bracket assembly 21. In the embodiment illustrated, the spring tabs 43 and 44 are formed along or near an upper edge of the bracket assembly 21. Other locations, of course, are acceptable.

A support ledge 45 also is formed from the material thickness 42 and extends perpendicularly outwardly from the face 41 side of the bracket assembly 21, being attached thereto along an edge 47 of an opening 48 left in the bracket assembly 21 by ledge 45 formation. Ledge 45 further has a tab 46 extending upwardly from it. Tab 46 is sized for reception in the groove 37 of the protector 29.

A spring couple 50 is lanced from the face 40 side toward the face 41 side of the bracket assembly 21 so as to define a channel 49. Spring couple 50 is utilized to position and hold a spring 61, the function of which is described in detail hereinafter. Conventionally, spring 61 is an open ended, serpentine design having a suitable protrusion which is inserted and frictionally held in the channel 49 of the spring couple 50. The open ends of the spring 61 are inserted in suitable openings formed in a lever 51 by any convenient method.

A lever opening 53 is formed in the bracket assembly 21, positioned below spring couple 50, along a bottom 52 of the front face 40. Opening 53 resembles a truncated, inverted triangle having its base near the spring couple 50. The function of the opening 53 is similar to that disclosed in the above-referenced Lewis U.S. Pat. No. 3,782,669, and details of the lever, spring and spring couple not disclosed herein and are intended to be incorporated by reference to the Lewis patent. In general, the lever 51 is inserted in the opening 53 and is movable therein against the bias of the spring 61 by action of an actuator 60. Actuator 60 is a conventional centrifugal device, and is not described in detail.

The front face 40 of the bracket assembly 21 includes a mounting area 55. The area 55 has a pair of openings 59 which receive conventional threaded fasteners to mount a switch means 56 to the bracket assembly 21.

Switch means 56 is conventional and a number of switches suitable for use with the invention disclosed herein are available commercially.

A pair of wings 57 and 58 extend outwardly from the mounting area 55. The wings 57 are offset axially some predetermined distance 64 which enables the wings 57 and 58 to be mounted along the face 19 of the respective surfaces 17 and 18 of the end shield 9 as previously described. The wings 57 and 58 have respective openings 62 and 63 formed in them for mounting the bracket assembly 21 to the surfaces 17 and 18. When so mounted, the bracket assembly 21 generally closes the mounting receptacle 24 of the end shield 9. A number of strengthening ribs 90 may be formed in the thickness 42 of the bracket assembly 21 to maintain rigidity of the assembly, if desired.

In use, the protector 29 is mounted along the support ledge 45 so that the groove 37 receives the tab 46. The bracket and protector 29 are positioned along the opening 81 and protector receptacle 27 from the motor side of the end shield 9 so that the wings 57 and 58 abut the surfaces 17 and 18. Conventional fasteners are used to attach the bracket assembly 21 to the end shield 9 through the openings 62 and 63 in the wings and the openings 20 in the surfaces 17 and 18. When so mounted, the spring tabs 43 and 44 bias the protector 29 into the receptacle 27 of the end shield 9.

It thus may be observed that a bracket assembly meeting all the ends and objects herein set forth above is provided by the invention disclosed.

Numerous variations, within the scope of the appended claims, will occur to those skilled in the art in light of the foregoing description and accompanying drawings. Thus, one or more features of the embodiment illustrated may be incorporated in other embodiments of the invention. For example, the design of the lever opening 53 in the bracket assembly 21 may vary in other embodiments of this invention. While the bracket 21, for example, has been described as a stamped metal part, other materials or techniques may be utilized in its construction. For example, molded plastic or aluminum may be utilized for bracket assembly construction. Various other switch designs are compatible with the bracket of this invention, the design illustrated in the drawings and described under the designation of reference numeral 56 merely being exemplary of the various commercial designs presently available. The design silhouette, relative dimensions and placement of the various structural components of the bracket assembly 21 may be varied in other embodiments of this invention. Thus, the location of the spring couple 50 may be changed or its structure varied. Likewise, the location, number and design of the spring tabs 43 and 44 may be altered as required by particular applications. The design silhouette of the end shield 9 may be varied to accomodate other designs for the bracket assembly 21. These variations are merely illustrative.

Having thus described the invention, what is claimed and desired to be secured by Letters Patent is:

1. An assembly for a motor, comprising:
   at least one end shield, said end shield receiving a motor protector;
   a bracket means for attaching external motor control components to said motor, said bracket having a face adapted for mounting at least one motor control device thereto, said face having a material thickness, at least one spring means formed on a side opposite said face, a ledge formed from said material thickness on a side opposite said face, said ledge having a tab integrally formed with it;
   mounting means integrally formed with the face of said bracket for attaching said bracket to said end shield;
   a protector mounted within said end shield, said protector being forced into said end shield by said spring means, said protector being supported on said ledge, said protector having an enclosure including a groove formed therein sized to receive the tab of said ledge; and
   a switch mounted to the face of said bracket.

2. The assembly of claim 1 wherein said mounting means includes a pair of wings offset from the face of said bracket, said wings being attached to said end shield on the motor side thereof.

3. The assembly of claim 2 wherein said bracket means has an opening in it, said opening adapted to receive a lever arm, and a lever arm pivotally mounted to said assembly and extending through said opening, said lever arm being L-shaped in side elevation.

4. The assembly of claim 3 wherein said bracket has a spring couple formed in it, and a spring mounted between said couple and said lever arm.

5. A mounting assembly for a motor, comprising:
   an end shield, said end shield including a channel for receiving a motor protector therein;
   bracket means for attaching external motor control components to said motor, said bracket means having a face adapted for receiving at least one motor control component, said face having a material thickness, and support means formed from said material thickness on a side of said bracket means opposite said face;
   a protector received in said channel, and supported by said support means and;
   said bracket means including at least one spring means formed from the material thickness thereof, said spring means being positioned on a side opposite said face and adapted to exert a force to bias said protector within said channel.

6. The assembly of claim 5 wherein said support means includes a pair of wings offset from the face of said bracket, said wings being attached to said end shield on the motor side thereof.

7. The assembly of claim 6 wherein said bracket means has an opening in it, said opening adapted to receive a lever arm, and a lever arm pivotally mounted to said assembly and extending through said opening, said lever arm being L-shaped in side elevation.

8. The assembly of claim 7 wherein said support means has a spring couple formed in it, and a spring mounted between said couple and said lever arm.

9. The assembly of claim 1 wherein said bracket means has an opening in it, said opening adapted to receive a lever arm, and a lever arm pivotally mounted to said assembly and extending through said opening, said lever arm being L-shaped in side elevation.

10. The assembly of claim 9 wherein said support means has a spring couple formed in it, and a spring mounted between said couple and said lever arm.

11. A mounting assembly for a motor, comprising:
    an end shield, said end shield for receiving a motor protector therein;
    bracket means of formed sheet metal having a material thickness for attaching external motor control components to said motor, said bracket means having a first face and a pair of wings positioned on opposed sides of said first face and adapted for mounting on the motor side of said end shield, said bracket means including support means formed from said material thickness on a second face opposite said first face, and a protector mounted within said end shield and being supported by said support means, at least one motor control component mounted on said first face of said bracket; and;

at least one spring means formed from the material thickness of said bracket means on said second face, said spring means exerting a force on said protector so as to bias said protector into the channel of said end shield.

12. A bracket assembly for attaching motor control components to a motor including an electrical switch having an external plunger portion for operating said switch, comprising:

a mounting surface adapted for mounting said switch to said bracket, said mounting surface having at least one opening in it near the location of said external plunger portion;

at least one wing mounting means integrally formed with but offset axially from said mounting surface for mounting said bracket on the motor; and a lever arm pivotally supported by said mounting surface, said lever arm including a leg extending through said opening in said mounting surface, said leg defining a plunger contact arm which abuts said external plunger and biasing means for biasing said plunger contact arm from said plunger, said bracket assembly including spring means formed integrally therefrom on a side opposite said mounting face, and a ledge formed from said bracket on a side opposite said face, said ledge having a tab integrally formed with it for mounting as a motor protector thereon.

* * * * *